US009804016B2

(12) United States Patent
Liebal et al.

(10) Patent No.: US 9,804,016 B2
(45) Date of Patent: Oct. 31, 2017

(54) FUEL DISPENSER FLOW METER HAVING VAPOR PRESSURE CORRECTION ARRANGEMENT

(71) Applicant: Gilbarco Inc., Greensboro, NC (US)

(72) Inventors: Michael Charles Liebal, Greensboro, NC (US); Christopher Adam Oldham, High Point, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 14/929,908

(22) Filed: Nov. 2, 2015

(65) Prior Publication Data
US 2016/0122174 A1 May 5, 2016

Related U.S. Application Data

(60) Provisional application No. 62/073,678, filed on Oct. 31, 2014.

(51) Int. Cl.
| | | |
|---|---|---|
| *G01F 25/00* | (2006.01) | |
| *B67D 7/04* | (2010.01) | |
| *B67D 7/08* | (2010.01) | |
| *G01F 15/02* | (2006.01) | |
| *B67D 7/20* | (2010.01) | |

(52) U.S. Cl.
CPC ........... *G01F 25/0007* (2013.01); *B67D 7/04* (2013.01); *B67D 7/085* (2013.01); *G01F 15/024* (2013.01); *B67D 7/0476* (2013.01); *B67D 7/20* (2013.01)

(58) Field of Classification Search
CPC ...... G01F 15/02; G01F 15/022; G01F 15/024; G01F 25/0007; B67D 7/04; B67D 7/085

USPC ................................ 141/59, 94, 95, 98, 192
See application file for complete search history.

(56) References Cited

U.S. PATENT DOCUMENTS

| | | | | |
|---|---|---|---|---|
| 4,522,237 A | * | 6/1985 | Endo | ...................... B67D 7/46 141/128 |
| 4,768,384 A | * | 9/1988 | Flecken | ................ G01F 1/8495 73/861.02 |
| 5,447,062 A | | 9/1995 | Kopl et al. | |
| 5,557,084 A | | 9/1996 | Myers et al. | |
| 5,689,071 A | | 11/1997 | Ruffner et al. | |
| 5,734,851 A | | 3/1998 | Leatherman et al. | |
| 5,954,080 A | | 9/1999 | Leatherman | |

(Continued)

FOREIGN PATENT DOCUMENTS

WO     2012076666 A2     6/2012

OTHER PUBLICATIONS

International Search Report and Written Opinion dated Feb. 4, 2016 in corresponding international application No. PCT/US2015/058627.

*Primary Examiner* — Timothy L Maust
(74) *Attorney, Agent, or Firm* — Nelson Mullins Riley & Scarborough, LLP (57) ABSTRACT

A method and apparatus for improving the accuracy of fuel flow meters by compensating for the presence of vapor bubbles generated within the flow meter. The method comprises measuring the temperature of the fuel flowing through the meter and using an algorithm or static lookup table to determine a vapor compensation factor based on that temperature. Because the tendency of fuel to vaporize depends largely on seasonal variations in fuel temperature, applying a temperature-dependent vapor compensation factor promotes year-round accuracy of the flow meter output.

18 Claims, 6 Drawing Sheets

(56) References Cited

U.S. PATENT DOCUMENTS

| | | | |
|---|---|---|---|
| 5,956,259 A | 9/1999 | Hartsell, Jr. et al. | |
| 6,052,629 A | 4/2000 | Leatherman et al. | |
| 6,067,917 A * | 5/2000 | Nimberger | A01C 23/007 111/119 |
| 6,199,434 B1 | 3/2001 | Cornil et al. | |
| 6,250,151 B1 | 6/2001 | Tingleff et al. | |
| 6,397,686 B1 | 6/2002 | Taivalkoski et al. | |
| 6,435,204 B2 | 8/2002 | White et al. | |
| 6,935,191 B2 | 8/2005 | Olivier et al. | |
| 7,111,520 B2 | 9/2006 | Payne et al. | |
| 7,168,464 B2 * | 1/2007 | Diggins | F17C 7/02 137/263 |
| 7,289,877 B2 | 10/2007 | Wilson | |
| 7,946,309 B2 | 5/2011 | Reid et al. | |
| 8,096,446 B2 | 1/2012 | Carapelli | |
| 8,285,506 B2 | 10/2012 | Oldham et al. | |
| 9,383,241 B2 * | 7/2016 | Weinstein | G01F 1/8436 |
| 2005/0028610 A1 | 2/2005 | Olivier et al. | |
| 2006/0027100 A1 | 2/2006 | Kozyuk | |
| 2008/0178687 A1 | 7/2008 | Amante et al. | |
| 2009/0032548 A1 * | 2/2009 | Larsson | B67D 7/228 222/1 |
| 2012/0031195 A1 | 2/2012 | Skirda et al. | |
| 2012/0285259 A1 * | 11/2012 | Boulanger | G01F 15/022 73/861.01 |
| 2013/0126553 A1 | 5/2013 | Williams | |
| 2014/0110429 A1 * | 4/2014 | Tronik | B67D 7/08 222/23 |
| 2015/0153210 A1 * | 6/2015 | Bartlett | G01F 1/8495 141/95 |
| 2016/0122175 A1 | 5/2016 | Liebal et al. | |

* cited by examiner

FUEL DISPENSER FLOW METER HAVING VAPOR PRESSURE CORRECTION ARRANGEMENT

PRIORITY CLAIM

This application is based upon and claims the benefit of provisional application Ser. No. 62/073,678, filed Oct. 31, 2014. The foregoing application is incorporated fully herein by reference for all purposes.

FIELD OF THE INVENTION

Embodiments of the present invention relate generally to flow meters for use in fuel dispensers. More specifically, embodiments of the present invention relate to a system and method for correction of vapor pressure error that can occur in some situations.

BACKGROUND

In a retail service station environment, customers use a fuel dispenser to pump fuel from an underground storage tank (UST) into their vehicle's fuel tank. Fuel flow meters are used by the fuel dispenser to measure the amount of fuel being dispensed. As fuel is dispensed, it flows through the flow meter, which generates an output signal proportional to the flow rate or volume of the fuel. The output signal, generally in the form of a pulse train, is received by the fuel dispenser control system, which calculates and displays the volume and price of fuel dispensed.

Fuel flow meters must be very accurate in order to ensure that customers are properly charged for the fuel that has been dispensed. Seasonal variations in fuel temperature can cause errors in flow meter output, thus requiring frequent meter testing and recalibration to ensure accuracy. Fuel flow meters must comply with regulatory requirements regarding measurement accuracy which are enforced by Weights & Measures (or an equivalent regulatory authority). Failure to comply with these regulatory requirements can result in an entire fueling station being temporarily shut down until the issues with the flow meters are rectified.

SUMMARY

Example embodiments of the present invention recognize and address considerations of prior art constructions and methods.

According to one aspect, an example embodiment of the present invention provides a method of measuring the flow rate of fuel in a fuel dispenser. The method comprises providing a fuel flow meter that measures the flow rate of fuel through the meter and measuring the temperature of the fuel using a temperature sensor. Based on temperature data from the temperature sensor, a vapor compensation factor is determined. The measured flow rate is converted to a corrected flow rate by applying the vapor compensation factor.

Another aspect of the present invention provides for using an algorithm or static lookup table to determine the vapor compensation factor based on the measured fuel temperature. The algorithm or table may optionally depend on the fuel density, and that density may be detected and incorporated as a factor in the algorithm or lookup table.

According to another aspect, an example embodiment of the present invention provides an apparatus for measuring the flow rate of fuel in a fuel dispenser. The apparatus may comprise a fuel flow meter configured to measure the flow rate of fuel through the meter, a temperature sensor for measuring the temperature of the fuel, and a signal processor for converting the measured flow rate to a corrected flow rate by applying a vapor compensation factor determined using temperature data from the temperature sensor.

In some example embodiments, the signal processor converts the measured flow rate to a corrected flow rate by using an algorithm or static lookup table to determine the vapor compensation factor based on the measured fuel temperature. The signal processor may additionally, or alternatively, use an algorithm or lookup table that depends on the fuel density. A fuel density meter may detect the fuel density and incorporate the density as a factor in the algorithm or lookup table.

Those skilled in the art will appreciate the scope of the present invention and realize additional aspects thereof after reading the following detailed description of example embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION

Reference will now be made in detail to certain preferred embodiments of the present invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

Some embodiments of the present invention are particularly suitable for use in a fuel dispensing environment, and the below discussion will describe example embodiments in that context. However, those of skill in the art will understand that the present invention is not so limited. In fact, it is contemplated that embodiments of the present invention may be used in other situations where the flow rate of liquid or gas products needs to be measured. In this regard, "flow rate" is used in the description below as a generic term for the rate of fluid dispensing.

Figure 1:
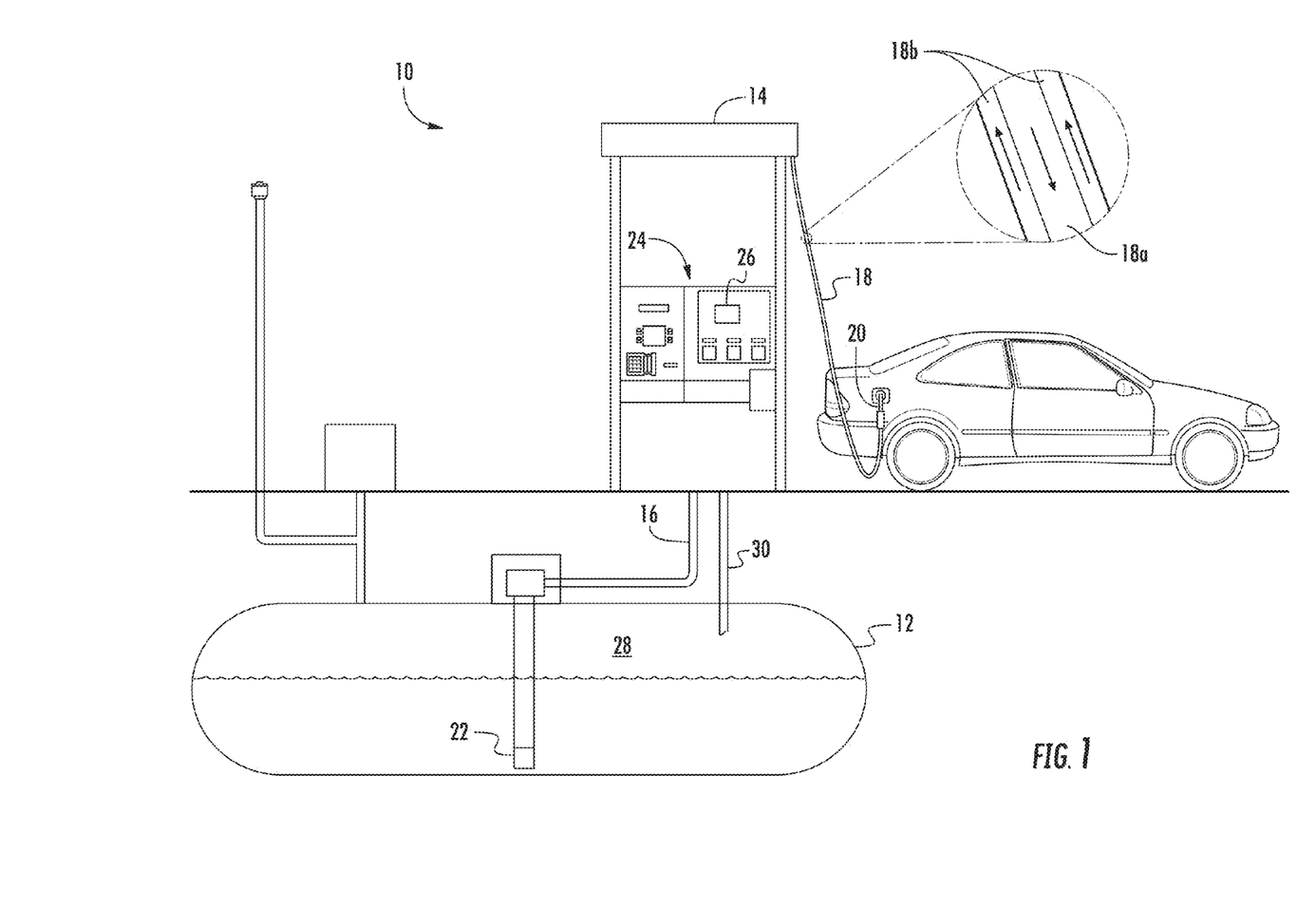
FIG. 1 is a diagrammatic view of a fuel dispensing facility where example embodiments of the present invention may be implemented.

FIG. 1 is a schematic diagram of a fuel dispensing facility 10 where exemplary embodiments of the present invention may be implemented. At these facilities, fuel is typically stored in underground storage tanks (USTs) 12 which are in fluid communication with one or more fuel dispensers 14 via underground piping conduit 16. Fuel dispenser 14 may be, for example, the ENCORE® fuel dispenser or the SK700 fuel dispenser, both sold by Gilbarco Veeder-Root. Those of skill in the art will appreciate, however, that the present invention may be used in a variety of fuel dispensers, or other dispensers of liquid or gas products.

Fuel dispenser 14 includes a housing with at least one flexible fuel hose 18 extending therefrom. Fuel hose 18 terminates in a manually-operated fuel dispensing nozzle 20 adapted to be inserted into a fill neck of a vehicle's fuel tank. When a customer places the spout of the fuel dispensing nozzle 20 into the vehicle's fuel tank and pulls the lever, a submersible turbine pump (STP) 22 pumps fuel through the underground fuel piping conduit 16 to the fuel dispenser 14. As will be discussed in more detail below in reference to FIG. 2, various fuel handling components located inside the housing allow fuel to be received from underground piping conduit 16 and delivered through the inner conduit 18a of coaxial fuel hose 18 and nozzle 20 to a vehicle's tank.

The fuel dispenser 14 has a customer interface 24 which may include a display 26 that shows the amount and price of fuel dispensed. The customer interface 24 may also include additional displays to, for example, provide instructions for basic transaction functions, such as initiating dispensing of fuel. The dispenser also preferably includes a credit card reader and a PIN pad to allow the customer to pay for the fuel at the dispenser using credit or debit cards.

In this embodiment, as the vehicle fuel tank is filled, entering fuel displaces fuel vapor already in the tank. Fuel dispensers are often equipped with vapor recovery systems for capturing these escaping vapors and delivering them back to the ullage space 28 of the UST 12. Exemplary vapor recovery systems use a vacuum source to draw escaping vapors along a vapor recovery path back into the ullage space 28. The vapor recovery path typically begins at the nozzle spout, where air and vapor are drawn in through a boot or a series of intake ports (not shown). The recovered vapors then flow through the nozzle to the outer vapor recovery conduit 18b of the fuel hose 18. Inside the fuel dispenser 14, a manifold (not shown) separates conduits 18a and 18b and connects them with piping conduit 16 and vapor return pipe 30, respectively. Specifically, conduit 18a is in fluid communication with underground piping conduit 16. Outer vapor recovery conduit 18b is in fluid communication with vapor return pipe 30, which returns the recovered vapors back into the ullage space 28 of the UST 12.

Figure 2:
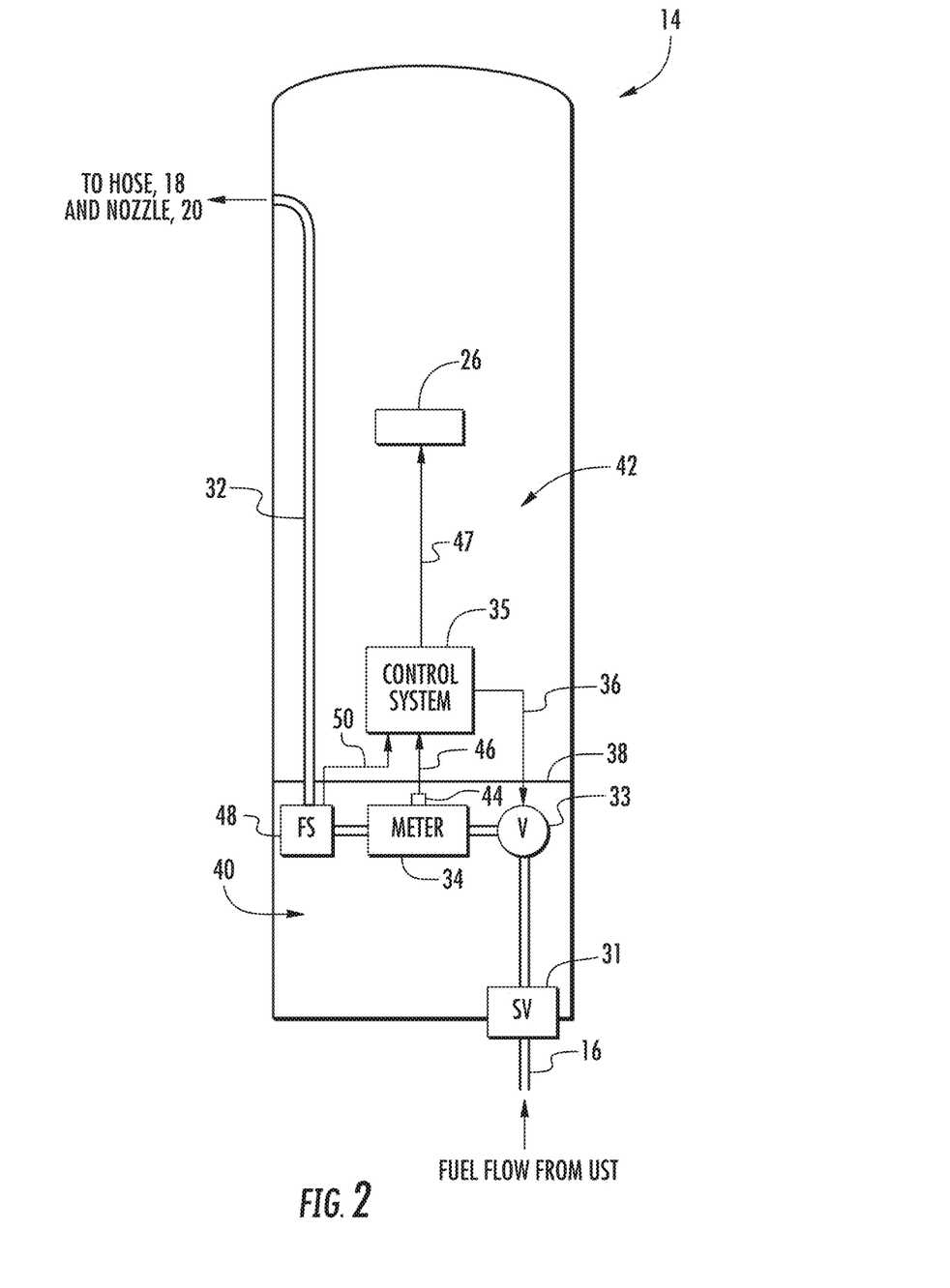
FIG. 2 is a diagrammatic view of internal fuel flow components of the fuel dispenser of FIG. 1.

FIG. 2 is a schematic illustration of internal components of fuel dispenser 14. In general, fuel may travel from an underground storage tank (UST) via main fuel piping 16 through shear valve 31. As is well known, shear valve 31 is designed to close the fuel flow path in the event of an impact to fuel dispenser 14. U.S. Pat. No. 7,946,309 to Reid et al., hereby incorporated by reference in its entirety for all purposes, discloses an exemplary shear valve adapted for use in service station environments. Shear valve 31 contains an internal fuel flow path to carry fuel from main fuel piping 16 to internal fuel piping 32.

After fuel exits the outlet of the shear valve 31 and enters into the internal fuel piping 32, it may encounter an electromechanical valve 33 positioned upstream of a flow meter 34. However, in some fuel dispensers, valve 33 may be positioned downstream of the flow meter 34. Valve 33 may be, for example, a proportional solenoid controlled valve, as described in U.S. Pat. No. 5,954,080 to Leatherman, hereby incorporated by reference in its entirety for all purposes.

Valve 33 is under control of a control system 35 via a control valve signal line 36. Control system 35 may comprise a microprocessor, microcontroller, or other suitable electronics with associated memory and software programs running thereon. Control system 35 controls the application of power from a power source to the valve coil. In this manner, control system 35 can control the degree of opening and closing of the proportional control valve 33 via the valve coil to allow fuel to flow or not flow through meter 34 and on to hose 18 and nozzle 20 at a desired flow rate, or not to flow at all.

A vapor barrier typically separates some of the mechanical or hydraulic components from the electrical components of the fuel dispenser 14. For example, proportional control valve 33 is typically contained below a vapor barrier 38 delimiting a hydraulics compartment 40 of the fuel dispenser 14. Control system 35, on the other hand, is typically located in an electronics compartment 42 of fuel dispenser 14 above vapor barrier 38. In this embodiment, after fuel exits proportional control valve 33, it may flow through meter 34, which measures the volume and/or flow rate of the fuel.

Flow meter 34 may be a positive displacement or inferential flow meter having one or more rotors which rotate on one or more shafts. Some examples of positive displacement flow meter technology which may be used with embodiments of the present invention are provided in U.S. Pat. No. 6,250,151 to Tingleff et al., U.S. Pat. No. 6,397,686 to Taivalkoski et al., and U.S. Pat. No. 5,447,062 to Kopl et al., each of which is hereby incorporated by reference in its entirety for all purposes. Likewise, examples of inferential flow meter technology are provided in U.S. Pat. No. 7,111,520 to Payne et al., U.S. Pat. No. 5,689,071 to Ruffner et al., and U.S. Pat. No. 8,096,446 to Carapelli, each of which is also incorporated by reference herein in their entireties for all purposes.

As shown in FIG. 2, meter 34 is operatively connected to a displacement sensor 44 that generates a signal indicative of the volume or flow rate of fuel and periodically transmits the signal to control system 35 via a signal line 46. In this manner, control system 35 can update the total gallons dispensed and the price of the fuel dispensed on display 26 via a communications line 47. In one embodiment, displacement sensor 44 may be a pulser. Those of ordinary skill in the art are familiar with pulsers that may be utilized with embodiments of the present invention. For example, displacement sensor 44 may be the T18350-G6 pulser offered by Gilbarco Inc. Reference is hereby made to U.S. Pat. No. 8,285,506, entitled "Fuel Dispenser Pulser Arrangement," granted Oct. 9, 2012, the entire disclosure of which is incorporated by reference herein for all purposes. In other embodiments, however, displacement sensor 44 may be another suitable displacement sensor.

In this embodiment, as fuel leaves flow meter 34, it enters a flow switch 48. Flow switch 48, which preferably includes a one-way check valve that prevents back flow through fuel dispenser 14, provides a flow switch communication signal to control system 35 via the flow switch signal line 50. The flow switch communication signal indicates to control system 35 that fuel is actually flowing in the fuel delivery path and that subsequent signals from sensor 44 are due to actual fuel flow.

After the fuel leaves flow switch 48, it exits through internal fuel piping 32 to be delivered through fuel hose 18 and nozzle 20 for delivery to the customer's vehicle. Nozzle 20 typically includes a manually-actuated valve as is well-known in the art. Further information on and examples of fuel dispensers and retail fueling environments are provided in U.S. Pat. Nos. 6,435,204; 5,956,259; 5,734,851; 6,052,629; 5,689,071; 6,935,191; and 7,289,877, all of which are incorporated herein by reference in their entireties for all purposes.

Figure 3:
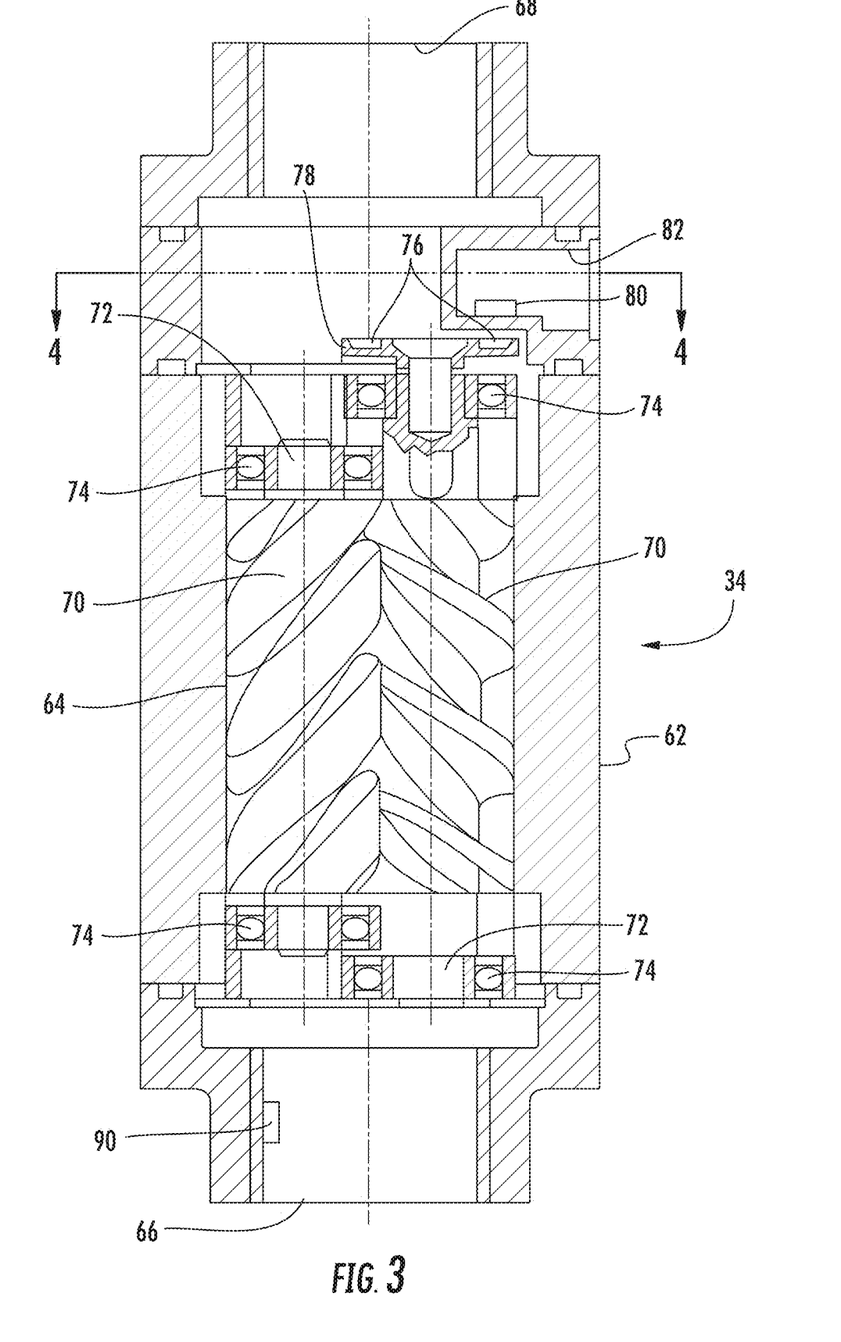
FIG. 3 is a sectional view of a flow meter constructed in accordance with embodiments of the present invention.

FIG. 3 illustrates a cross-sectional view of a flow meter in which example embodiments of the present invention may be implemented. This type of flow meter 34 is known in the art as an axial positive displacement meter, meaning that each rotation of the spindle captures and displaces a specific volume of fuel. The flow meter 34 is placed inline with the internal fuel piping 32 and comprises a housing 62 with a hollow bore 64 extending axially from an inlet 66 to an outlet 68. Inside the housing 62, two spindles 70 are supported on their own shafts 72 and are oriented in parallel with the hollow bore 64 of the housing 62. Each spindle shaft 72 is supported by a pair of bearings 74, one located upstream and one located downstream of the spindles 70. The flow meter housing 62, spindles 70, shafts 72, bearings 74, and any other components exposed to fuel are preferably constructed of suitable metal or another material that may suitably withstand the corrosive effects of the fuel.

The spindles 70 each comprise one or more interlocking threads such that the spindles 70 rotate together as fuel flows axially through the inlet 66, across the spindles 70, and out of the outlet 68. During each rotation of the spindles 70, a specific volume of liquid is captured from the inlet 66 and the same amount is expelled from the output 68. The flowing fuel causes the spindles 70 to rotate at a speed proportional to the fuel flow rate. Therefore, by measuring the rotational speed of one of the shafts 72, the flow rate of the liquid fuel can be determined.

Figure 4:
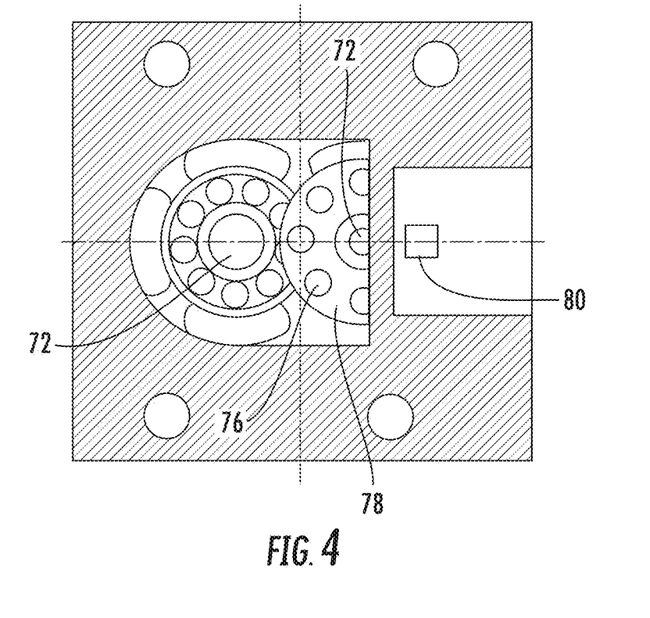
FIG. 4 illustrates a cross-sectional view of the flow meter of FIG. 3 taken along line 4-4.

One method of measuring the rotational speed of the spindles, and thus the rate of fluid flow, is to detect the rotational speed of one of the spindle shafts using a series of magnets and a measuring transducer. In the example embodiment, the magnets 76 are mounted on an exciter disc 78 that is coaxially mounted on the downstream end of one of the spindle shafts 72 (see FIG. 4). The magnets 76 are uniformly spaced around a circumferential portion of the exciter disc 78. A measuring transducer, e.g., a Hall-effect sensor 80, is placed opposite of the exciter disc 78 in a compartment 82 that is separated from the fluid flow. The Hall-effect sensor 80 is configured to generate a pulse train in response to the passing magnets 76. Each pulse may indicate that a specific volume of fuel has been displaced (e.g., 1 pulse=1/1000 gallon of fuel). Therefore, as the spindle shaft 72 spins, the Hall-effect sensor 80 generates a pulse train that is proportional to the rotational speed of the spindle 70 and thus can provide a measure of the flow rate through the meter 34. One skilled in the art will appreciate that this method of measuring the rotational speed of the spindle shafts is only one possible method. Other methods may use, for example, a tachometer or an encoder.

In general, positive displacement meters can provide a measure of the volumetric flow of liquid through the flow meter. However, any vapor generated in the captured volume can cause undesired variation in the measurement. The size of the flow meter components and the captured volume of liquid are small. Therefore, the spindles must be able to rotate at very high speeds in order to meet expected system flow rates. This high speed rotation generates significant internal fluid friction between the rotating components and the housing. The edges of the rotating spindles cause high shear forces and generate localized pressure drops where the edges of the spindles move quickly through the fuel. Therefore, vapor generation is increased, and the presence of vapor bubbles in flow meters is a common occurrence. Typically, the liquid is vaporized in the meter itself, and the vaporized fuel condenses back to liquid form downstream after exiting the flow meter outlet. However, because the flow meter's accuracy depends on the displacement of fluid, the presence of vapor bubbles within the meter introduces error into the volumetric measurement.

In general, the amount of vapor generated in a fluid is directly related to the fluid's equilibrium vapor pressure. When the localized pressure of a fluid is below the fluid's equilibrium vapor pressure, portions of the fluid convert from liquid to vapor bubbles. This is commonly referred to as cavitation. Thus, lower equilibrium vapor pressure results in the generation of less vapor, while more vapor is generated as the fluid's equilibrium vapor pressure increases.

Figure 5:
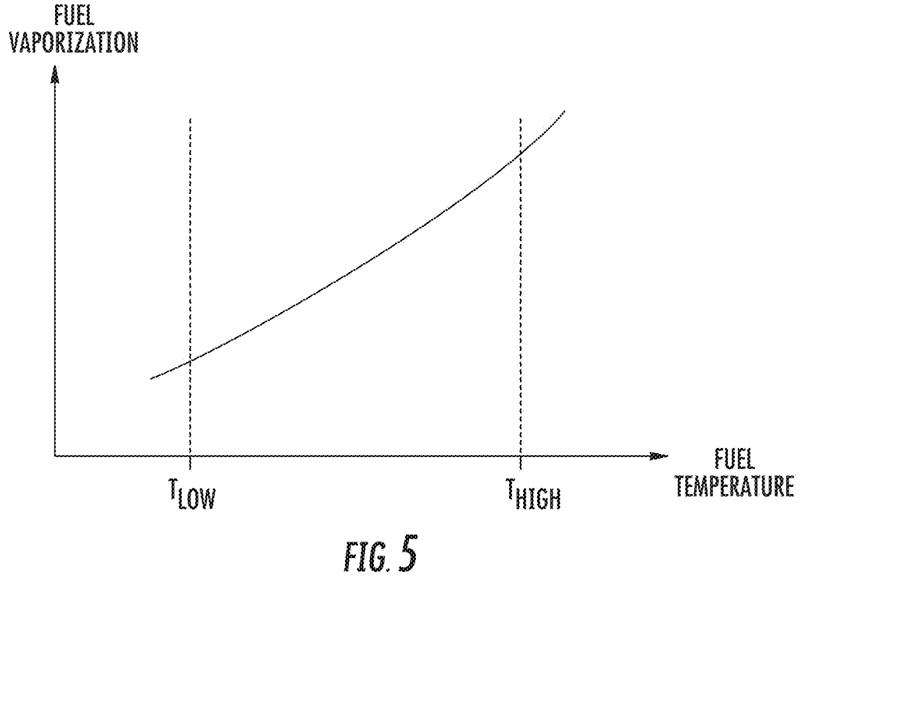
FIG. 5 is a plot generally showing the relationship between fuel vaporization and fuel temperature.

The equilibrium vapor pressure of fuel—and thus its tendency to vaporize—is directly related to the fuel temperature. For example, FIG. 5 shows the relationship between fuel vaporization and fuel temperature generally. As can be seen, as the fuel temperature increases, the fuel has an increased tendency to vaporize. In addition, the tendency of fuel to vaporize is independent of the fluid flow rate, system pressure, and the location of the meter within the hydraulics.

As a result, during the summer when fuel temperatures are elevated, the equilibrium vapor pressure of the fuel is higher, and the generation of vapor bubbles in the flow meter spindles increases. The increased vapor in the meter causes less liquid fuel to be displaced during each rotation of the spindles. By contrast, as the fuel temperature decreases in the winter, the generation of vapor in the flow meter spindles is decreased. Therefore, fuel flow meters exhibit significant seasonal variations and require frequent testing and calibration to ensure accurate measurement.

The pulse train generated by the Hall-effect sensor 80 represents the raw or uncorrected flow rate independent of mechanical wear or other factors that require compensation. In order to determine the actual or corrected flow rate, the pulse train may be received by a signal processor, where it may be processed, compensated, corrected, or otherwise analyzed. For example, the signal processor may count the number of pulses and apply a compensation or calibration factor to calculate the corrected flow rate. The control system 35 can then use the corrected flow rate to determine the volume and price of the fuel dispensed, and present this information to the customer via display 26. The signal processor may be packaged with the flow meter, may be a separate stand-alone unit, or may be incorporated into the control system 35. In any event, the compensation applied is based on the most recent calibration of the meter.

Occasional calibration can be effectively used to compensate for relatively static errors. However, due to the temperature-dependent nature of vapor bubble generation, and the resulting seasonal variation in the presence of vapor bubbles, flow meters must be recalibrated multiple times throughout the year to remain accurate. Thus, the amount of vapor generated—and thus the calibration—varies seasonally. If the calibration was conducted during a prior season, it will not likely compensate for the vapor effects discussed above. Thus, failure to properly maintain the calibration of the flow meter may result in a fuel dispenser falling outside regulatory limits regarding the accuracy of the flow meters.

Embodiments of the present invention provide a method and system of correcting flow rate measurement errors due to vapor generation resulting from seasonal variations in the fuel temperature. The system utilizes a signal processor to correct such errors such as by modifying a pulse train generated by the displacement sensor. The signal processor may be packaged with the flow meter or may be a separate stand-alone unit. In some embodiments, the signal processor for correcting the uncorrected flow rate may be incorporated into the control system 35. In such an embodiment, the flow meter 34 and displacement sensor 44 would communicate an uncorrected flow rate to the control system 35 via signal line 46. The control system 35 would then process the signal to determine a flow rate, compensate for the presence of vapor bubbles, and calculate the volume and price of fuel dispensed.

Figure 6:
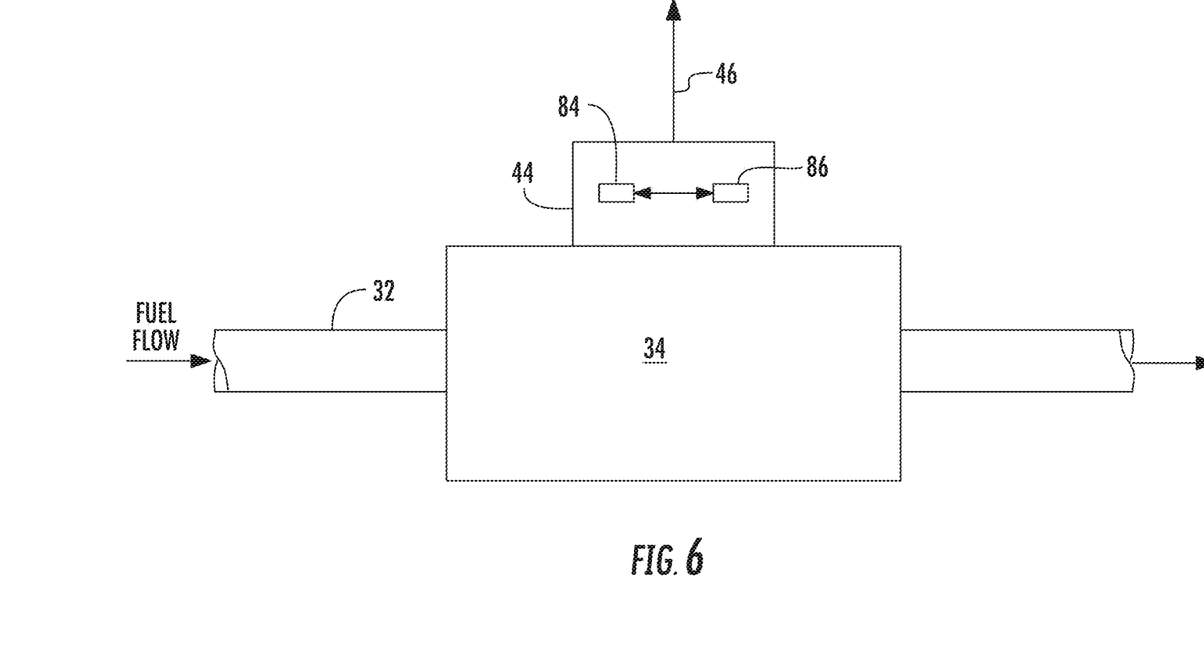
FIG. 6 is a schematic diagram of an integrated fuel flow meter and displacement sensor with an internal signal processor and memory in accordance with an example embodiment of the present invention.

However, in a preferred embodiment, flow meter 34 and displacement sensor 44 are contained in a single, integrated package that communicates a vapor corrected pulse train to the control system 35 via signal line 46. Such a configuration allows for easy installation, calibration, and troubleshooting. FIG. 6 shows such an integrated package, where the flow meter 34 has a displacement sensor 44 mounted thereon. In this embodiment, the displacement sensor 44 comprises a signal processor 84 and memory 86. The memory 86 stores compensation information, such as, for example, a compensation algorithm or static lookup table. Other suitable processing circuitry may comprise a microprocessor, microcontroller, or other electronics with associated memory and software programs running thereon.

In an example embodiment, the compensation algorithm or lookup table determines a compensation factor based on the fuel temperature. A temperature sensor 90 may be inserted into the meter 34 to measure fluid temperature directly, or may be placed on a piece of tubing through which fluid is flowing in order to measure the fluid temperature indirectly. As shown in the example embodiment of FIG. 3, the temperature sensor 90 could be placed at the inlet 66 of flow meter 34 to detect rapidly changes in the temperature of the fuel. While embodiments are contemplated in which temperature data is fed (e.g., serially) to control system 35 so that the adjustment can be accomplished there, the adjustment is accomplished in processor 84 in the present embodiment. In particular, processor 84 uses the temperature data to determine the appropriate flow rate adjustments or compensation. Simply speaking, the algorithm would be designed to reduce pulse counts for higher temperatures and increase pulse counts at lower temperatures. In some preferred embodiments, temperatures below a certain threshold (such as corresponding to winter months) result in no adjustment, whereas temperatures at or above the threshold result in adjustment.

The compensation algorithm could be fully dependent on the meter type and model, such that different meters might have a different algorithm or table and generate a customized compensation factor. For example, the adjustments for a piston meter would be different than a spindle meter. In this regard, a software-based lookup table may be used to generate a calibration factor based on the meter type, fuel temperature, and/or other factors. The algorithm or lookup table could differ based on fuel type or density which, for example, would allow for the use of different tables or formulas for diesel, gasoline, ethanol, biodiesel, or other fuels. Optionally, a density sensor could be used to detect the fuel density and that density could be incorporated into the algorithm for determining the proper compensation factor.

Figure 7:
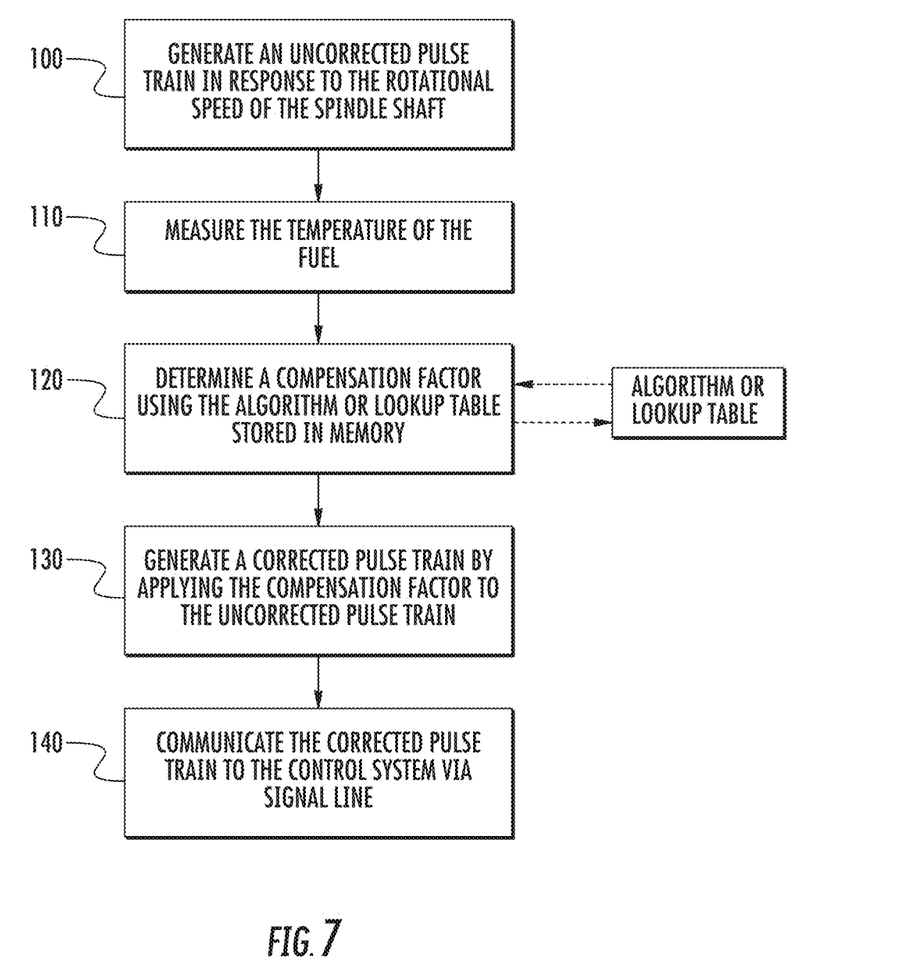
FIG. 7 is a flow chart showing a method of compensating for errors in flow meter measurements in accordance with an example embodiment of the present invention.

As shown in FIG. 7, an example embodiment of the present invention provides a method for making a predictable set of adjustments, based on temperature, to compensate for vapor generation. At step 100, the displacement sensor generates an uncorrected pulse train in response to the rotational speed of the spindle shaft. The temperature of the fuel is measured at step 110. At step 120, the signal processor uses the algorithm or static lookup table stored in memory to determine a compensation factor sufficient to compensate for vapor based on the measured fuel temperature. The signal processor applies the compensation factor to the uncorrected pulse train and generates a corrected pulse train at step 130. At step 140, the corrected pulse train, which represents the actual flow rate of fuel, is communicated to the control system 35 via signal line 46. Control system 35 then uses the corrected pulse train in the money/volume calculation.

It can thus be seen that the present invention reduces the impact of changing fuel vapor pressure via fuel temperature which occurs naturally due to changing seasons. While one or more example embodiments of the invention have been described above, it should be understood that any and all equivalent realizations of the present invention are included within the scope and spirit thereof. In addition, the embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

The invention claimed is:

1. An apparatus for measuring the flow rate of liquid fuel in a fuel dispenser, comprising:
    a positive displacement fuel flow meter configured to measure the flow rate of fuel through the meter, said positive displacement flow meter having rotating structure that creates temperature-dependent temporary vaporization of the fuel inside the flow meter;
    a temperature sensor for measuring the temperature of the fuel; and
    a signal processor and associated memory, said signal processor being operative to convert the measured flow rate to a corrected flow rate by applying a varying vapor compensation factor based upon and determined using temperature data from the temperature sensor.

2. The apparatus of claim 1, wherein the signal processor converts the measured flow rate to a corrected flow rate by using at least one of an algorithm and static lookup table to determine the vapor compensation factor based on the measured fuel temperature.

3. The apparatus of claim 1, wherein the fuel flow meter has a housing defining a hollow bore through which the fuel flows, the temperature sensor being located at an inlet of the housing.

4. The apparatus of claim 3, wherein the signal processor is located adjacent to said housing of the fuel flow meter.

5. The apparatus of claim 1, wherein the positive displacement flow meter comprises interlocking rotatable spindles.

6. The apparatus of claim 1, wherein the signal processor converts the measured flow rate to a corrected flow rate using at least one of an algorithm and lookup table that depends at least in part on the fuel density in addition to said temperature.

7. The apparatus of claim 1, further comprising a fuel density meter, wherein fuel density is detected as the fuel flows and incorporated as a factor in at least one of an algorithm and lookup table.

8. The apparatus of claim 1, wherein the measured flow rate and the corrected flow rate are each in the form of respective first and second pulse trains indicative of flow through the flow meter.

9. The apparatus of claim 8, wherein the fuel flow meter comprises a displacement sensor to generate the first pulse train.

10. A fuel dispenser for dispensing liquid fuel, said fuel dispenser comprising:
   a housing;
   internal piping located in said housing for fluid communication with a source of fuel;
   a flexible hose external to said housing, a proximal end of said hose being in fluid communication with said internal piping;
   a nozzle located at a distal end of the flexible hose; and
   a positive displacement fuel flow meter configured to measure the flow rate of the liquid fuel through the meter, said positive displacement flow meter having rotating structure that creates temperature-dependent temporary vaporization of the fuel inside the flow meter;
   a temperature sensor associated with said internal piping for measuring the temperature of the fuel; and
   a signal processor and associated memory, said signal processor being operative to convert the measured flow rate to a corrected flow rate by applying a vapor compensation factor based upon and determined using temperature data from the temperature sensor.

11. The fuel dispenser of claim 10, wherein the fuel flow meter has a housing defining a hollow bore through which the fuel flows, the temperature sensor being located at an inlet of the housing.

12. A method of measuring the flow rate of liquid fuel in a fuel dispenser, comprising:
   providing a positive displacement fuel flow meter that measures the flow rate of fuel through the meter, said positive displacement flow meter having rotating structure that creates temperature-dependent temporary vaporization of the fuel inside the flow meter;
   measuring the temperature of the fuel using a temperature sensor; and
   converting the measured flow rate to a corrected flow rate by applying a varying vapor compensation factor based upon and determined using temperature data from the temperature sensor.

13. The method of claim 12, wherein the step of converting the measured flow rate to a corrected flow rate comprises using an algorithm or static lookup table to determine the vapor compensation factor.

14. The method of claim 12, wherein the step of converting the measured flow rate to a corrected flow rate comprises using at least one of an algorithm and lookup table that depends at least in part on the fuel density in addition to temperature.

15. The method of claim 14, wherein the fuel density is detected as the fuel flows.

16. The method of claim 12, wherein the measured flow rate and the corrected flow rate are each in the form of respective first and second pulse trains indicative of flow through the fuel flow meter.

17. The method of claim 16, further comprising outputting the second pulse train to a control system of a fuel dispenser.

18. The method of claim 17, wherein the converting step is performed using a signal processor located adjacent to a housing of the fuel flow meter.

* * * * *